(12) United States Patent
Choi et al.

(10) Patent No.: US 7,507,958 B2
(45) Date of Patent: Mar. 24, 2009

(54) CONDUCTIVE CARBON NANOTUBE TIP, PROBE HAVING THE CONDUCTIVE CARBON NANOTUBE TIP, AND METHOD OF MANUFACTURING THE CONDUCTIVE CARBON NANOTUBE TIP

(75) Inventors: Sang-jun Choi, Yongin-si (KR); Jung-hyun Lee, Yongin-si (KR); Sang-bong Bang, Yongin-si (KR); Bum-seok Seo, Yongin-si (KR); Chang-soo Lee, Yongin-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 385 days.

(21) Appl. No.: 11/513,197

(22) Filed: Aug. 31, 2006

(65) Prior Publication Data
US 2007/0164214 A1 Jul. 19, 2007

(30) Foreign Application Priority Data
Jan. 14, 2006 (KR) ............... 10-2006-0004170

(51) Int. Cl.
*G01N 23/00* (2006.01)

(52) U.S. Cl. ............... 250/306; 250/307; 977/876; 977/879

(58) Field of Classification Search ............... None
See application file for complete search history.

(56) References Cited

U.S. PATENT DOCUMENTS

| 7,166,325 | B2 * | 1/2007 | Dai et al. | 427/249.1 |
| 7,416,699 | B2 * | 8/2008 | Dai et al. | 422/82.02 |
| 2007/0285013 | A1 * | 12/2007 | Amano | 313/584 |

* cited by examiner

*Primary Examiner*—Jack I Berman
*Assistant Examiner*—Andrew Smyth
(74) *Attorney, Agent, or Firm*—Buchanan Ingersoll & Rooney PC

(57) ABSTRACT

A conductive carbon nanotube tip and a manufacturing method thereof are provided. The conductive carbon nanotube tip includes a carbon nanotube tip substantially vertically placed on a substrate, and a ruthenium coating layer covering a surface of the carbon nanotube tip and extending to at least a part of the substrate. The manufacturing method includes substantially vertically placing a carbon nanotube tip on a substrate, and forming a ruthenium coating layer on the carbon nanotube tip and at least a part of the substrate.

13 Claims, 5 Drawing Sheets

CONDUCTIVE CARBON NANOTUBE TIP, PROBE HAVING THE CONDUCTIVE CARBON NANOTUBE TIP, AND METHOD OF MANUFACTURING THE CONDUCTIVE CARBON NANOTUBE TIP

CROSS-REFERENCE TO RELATED PATENT APPLICATION

This application claims the benefit of Korean Patent Application No. 10-2006-0004170, filed on Jan. 14, 2006, in the Korean Intellectual Property Office, the disclosure of which is incorporated herein in its entirety by reference.

BACKGROUND OF THE DISCLOSURE

1. Field of the Disclosure

The present disclosure relates to a conductive carbon nanotube tip, a probe having the conductive carbon nanotube tip, and a method of manufacturing the conductive carbon nanotube tip.

2. Description of the Related Art

Generally, a scanning probe microscope (SPM) is a device for measuring a variety of physical values of a test piece by scanning the test piece using a probe. The SPM is referred to as a third generation microscope that is useful for a surface analysis of a thin film.

The SPM includes a probe having a tip and a scanner for scanning a surface of the test piece using the tip, a control/process unit for controlling the scanner and processing a signal from the scanner. The SPM has been developed in a variety of configurations, such as a scanning tunneling microscope (STM) using a current generated by a voltage difference between the tip and the test piece, an atomic force microscope (AFM) using a variety of atomic forces generated between the tip and the test piece, a magnetic force microscope (MFM) using a magnetic force generated between the magnetic field of the test piece and the magnetized tip, an electrostatic force microscope (EFM) using an electrostatic force generated between the test piece and the tip, and a scanning capacitance microscope (SCM) measuring an electric capacity of the surface of the test piece.

In the EFM, SCM, and other conductive measuring units, a probe having a conductive tip is used. In this instance, there is a need to minimize a diameter of the conductive tip to enhance the resolution. In the prior art, a conductive tip formed of a silicon tip on which metal is coated has been used. However, due to the limitations in the material and the manufacturing process, it commonly is difficult to reduce the diameter of the tip to less than 100 nm. Therefore, it is difficult to analyze a grain size test piece or a nano-scale element.

From the late 1990s, the AFM has employed a carbon nanotube tip having a diameter of several to tens nanometer scale to enhance the resolution thereof. However, since the carbon nanotube used in the AFM has a relatively high electric resistance value, it cannot properly be used as a conductive tip for the EFM, MFM and SCM.

SUMMARY OF THE DISCLOSURE

The present invention may provide a conductive carbon nanotube tip that has a nano-scale diameter and the same conductivity as a metal electrode and thus is capable of improving the resolution and the endurance of a device to which it is applied.

The present invention also may provide a probe of an SPM (Scanning Probe Microscope) having the conductive carbon nanotube tip.

The present invention also may provide a method of manufacturing the conductive carbon nanotube tip having a ruthenium (Ru) coating layer.

According to an aspect of the present invention, there may be provided a conductive carbon nanotube tip including: a carbon nanotube tip substantially vertically placed on a substrate; and a ruthenium coating layer covering a surface of the carbon nanotube tip and extending to at least a part of the substrate.

A thickness of the ruthenium coating layer may be approximately 5-100 nm, and more preferably approximately 20-30 nm. The ruthenium coating layer may be formed through an Atomic Layer Deposition (ALD) process.

According to another aspect of the present invention, there may be provided a probe of a scanning probe microscope, including: a cantilever having a first end fixed on a support; a carbon nanotube tip substantially vertically placed on the cantilever near a second end thereof; and a ruthenium coating layer covering a surface of the carbon nanotube tip and extending to at least a part of the cantilever.

A thickness of the ruthenium coating layer may be approximately 5-100 nm, and more preferably approximately 10-30 nm. The ruthenium coating layer may be formed through an Atomic Layer Deposition (ALD) process to improve step coverage of the carbon nanotube.

According to still another aspect of the present invention, there may be provided a method of manufacturing a conductive carbon nanotube tip, including: substantially vertically placing a carbon nanotube tip on a substrate; and forming a ruthenium coating layer on the carbon nanotube tip and at least a part of the substrate.

The substantially vertically placing of the carbon nanotube tip may include forming a protrusion by etching or grinding the substrate and setting up the carbon nanotube on an apex of the protrusion.

BRIEF DESCRIPTION OF THE DRAWINGS

The above and other features and advantages of the present invention are illustrated in detailed exemplary embodiments thereof with reference to the attached drawings in which.

DETAILED DESCRIPTION OF EXEMPLARY EMBODIMENTS

Figure 1:
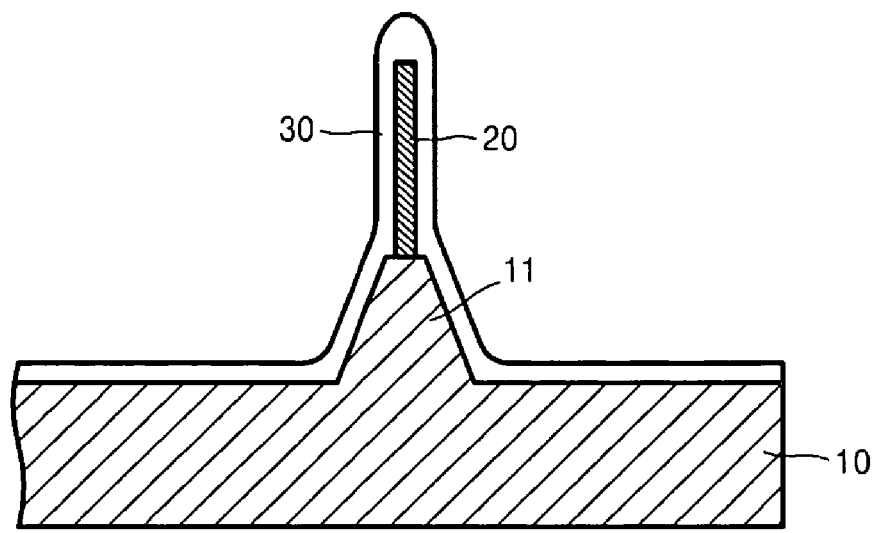
FIG. 1 is a sectional view of a conductive carbon nanotube tip according to an embodiment of the present invention.

The present invention will now be described more fully with reference to the accompanying drawings, in which exemplary embodiments of the invention are shown. In the drawings, the thicknesses and diameters of elements are exaggerated for clarity.

FIG. 1 is a sectional view of a conductive carbon nanotube according to an embodiment of the present invention.

Referring to FIG. 1, a carbon nanotube 20 is substantially vertically arranged on a top surface of a substrate 10. That is, a bottom of the carbon nanotube 20 is fixed on the top surface of the substrate 10 to form a carbon nanotube tip. A ruthenium coating layer 30 is formed on the carbon nanotube 20 and extends toward at least a portion of the top surface of the substrate 10.

The substrate 10 may be a semiconductor substrate or formed of a material such as glass or synthetic resin. However, the substrate 10 is desirably formed of a material that can allow the carbon nanotube 20 and the ruthenium coating layer 30 to be adhered to the substrate 10 with a sufficient adhering force. A protrusion 11 is formed on the top surface of the substrate 10 and the bottom of the carbon nanotube 20 is fixed on the apex of the protrusion 11. The protrusion 11 may be formed in a shape selected from the group consisting of a circular cone, a polygonal cone, a circular truncated cone, and a polygonal truncated cone, and a polygonal pillar. The top and bottom are referred with reference to the drawing. This will be likewise applied to the following description.

A thickness of the ruthenium coating layer 30 may be within a range of approximately 5-100 nm. When the thickness is less than approximately 5 nm, it is difficult to obtain the sufficient conductivity by which the carbon nanotube functions as the conductive tip, and when the thickness is greater than approximately 100 nm, the diameter of the tip increases excessively. More preferably, the thickness of the ruthenium coating layer 30 may be within a range of approximately 10-30 nm within which the sufficient conductivity can be obtained and the tip can have a diameter appropriate to scan the nano-scale test piece.

The ruthenium coating layer 30 may be formed through, for example, an atomic layer deposition (ALD) process. Since the ALD process provides good step coverage, the ruthenium can be effectively deposited on the carbon nanotube 20 vertically erected from the substrate 10.

Figure 2:
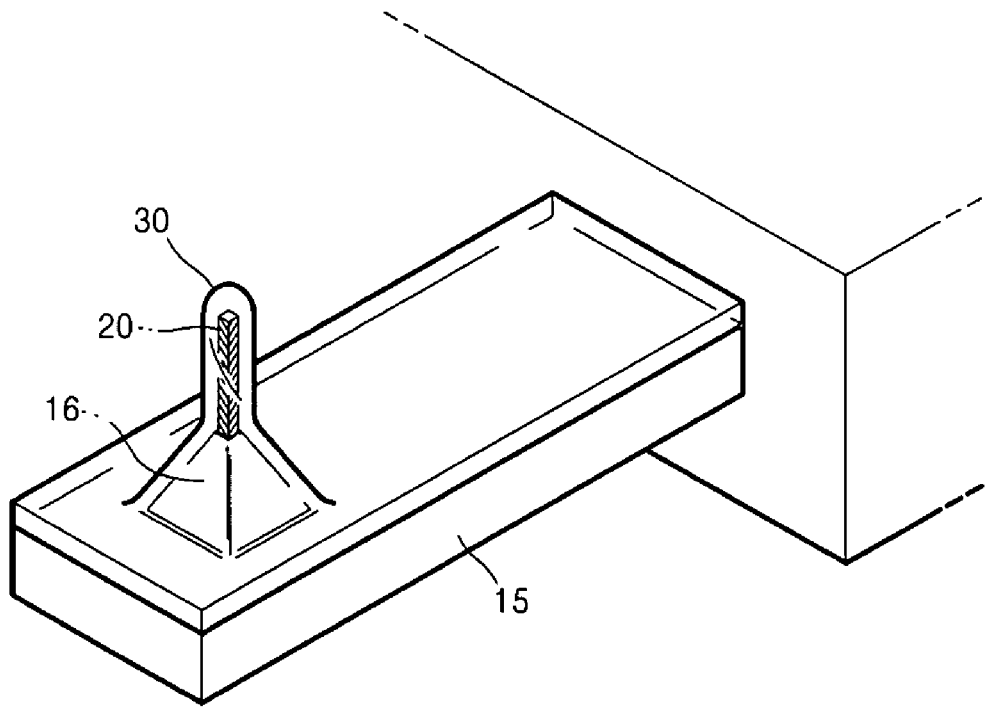
FIG. 2 is a perspective view of a probe of an SPM according to an embodiment of the present invention.

FIG. 2 is a perspective view of a probe of an SPM according to an embodiment of the present invention.

Referring to FIG. 2, a cantilever 15 has a first end fixed on a support. A protrusion 16 is formed near a second end of the cantilever 15 and the carbon nanotube 20 is vertically arranged on the protrusion 16. That is, the bottom of the carbon nanotube 20 is fixed on the apex of the protrusion 16. The ruthenium coating layer 30 is formed on the carbon nanotube 20 and extends toward at least a portion of the top surface of the cantilever 15. That is, the ruthenium coating layer 30 may be formed on the overall top surface of the cantilever 15 or partly formed on a portion of the top surface around the bottom of the carbon nanotube 20. Although not shown in the drawing, the ruthenium coating layer 30 is electrically connected to a voltage apply unit of the SPM, such as the EFM or SCM.

The vertical arrangement of the carbon nanotube 20 relative to the cantilever 15 provides that the carbon nanotube 20 is arranged at an angle where it can transmit a force to the cantilever 15 without being bent when the force is applied to a top of the carbon nanotube 20 in a vertical direction.

The cantilever 15 may be formed of, for example, silicon. However, the present invention 15 is not limited to this embodiment. The cantilever 15 is desirably formed of a material that can allow the carbon nanotube 20 and the ruthenium coating layer 30 to be adhered to the surface of the cantilever 15 with a sufficient adhering force. Furthermore, the cantilever 15 is desirably formed of a material that can allow the cantilever 15 to be elastically bent within an elastic limitation against the force applied from the probe of the SPM and to provide sufficient endurance against the repeated bending action.

As described in FIG. 1, a thickness of the ruthenium coating layer 30 may be within a range of approximately 5-100 nm, and more preferably approximately 10-30nm. Since a diameter of the carbon nanotube 20 is approximately 5 nm, the probe having a resolution that can analyze a nano-scale test piece can be realized. In addition, the ruthenium coating layer 30 and the carbon nanotube 20 may have a relatively high hardness. Therefore, the probe of this embodiment has good endurance.

Figure 3A:
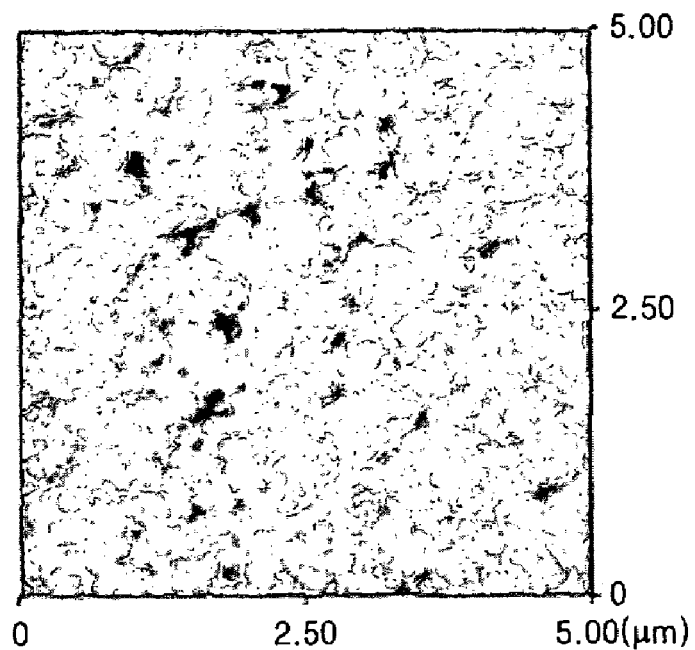
FIG. 3A is an EFM image of a PZT test piece, which is taken using a silicon-based conductive tip.

FIG. 3A is an EFM image of a PZT test piece, which is obtained using a prior art silicon-based conductive tip.

The image of FIG. 3A shows a 5×5 $\mu m^2$ area of the test piece and it is noted that a domain boundary is not clear. This shows that the prior art silicon-based conductive tip including a silicon tip and a metal coating layer formed on the silicon tip and having a diameter greater than approximately 100 nm cannot achieve enough resolution for the analysis of a test piece less than approximately 100 nm.

Figure 3B:
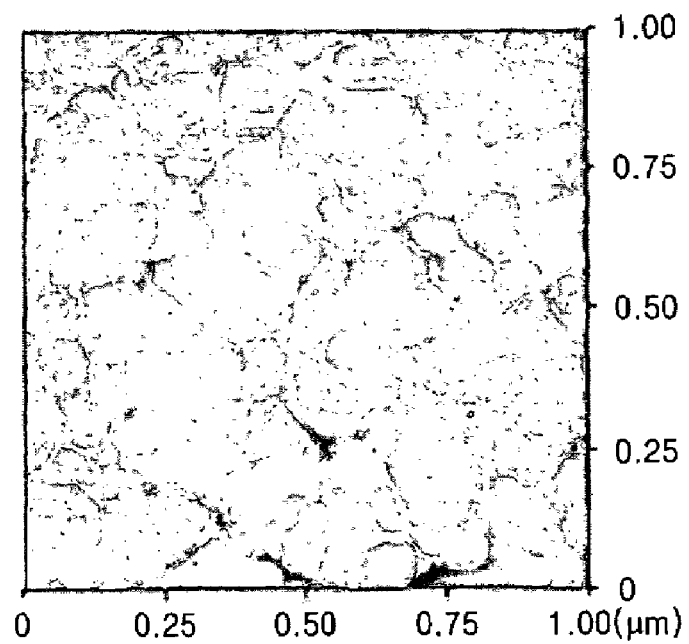
FIGS. 3B and 3C are EFM images of a PZT test piece, which are taken using a probe according to the embodiment of FIG. 2.
Figure 3C:
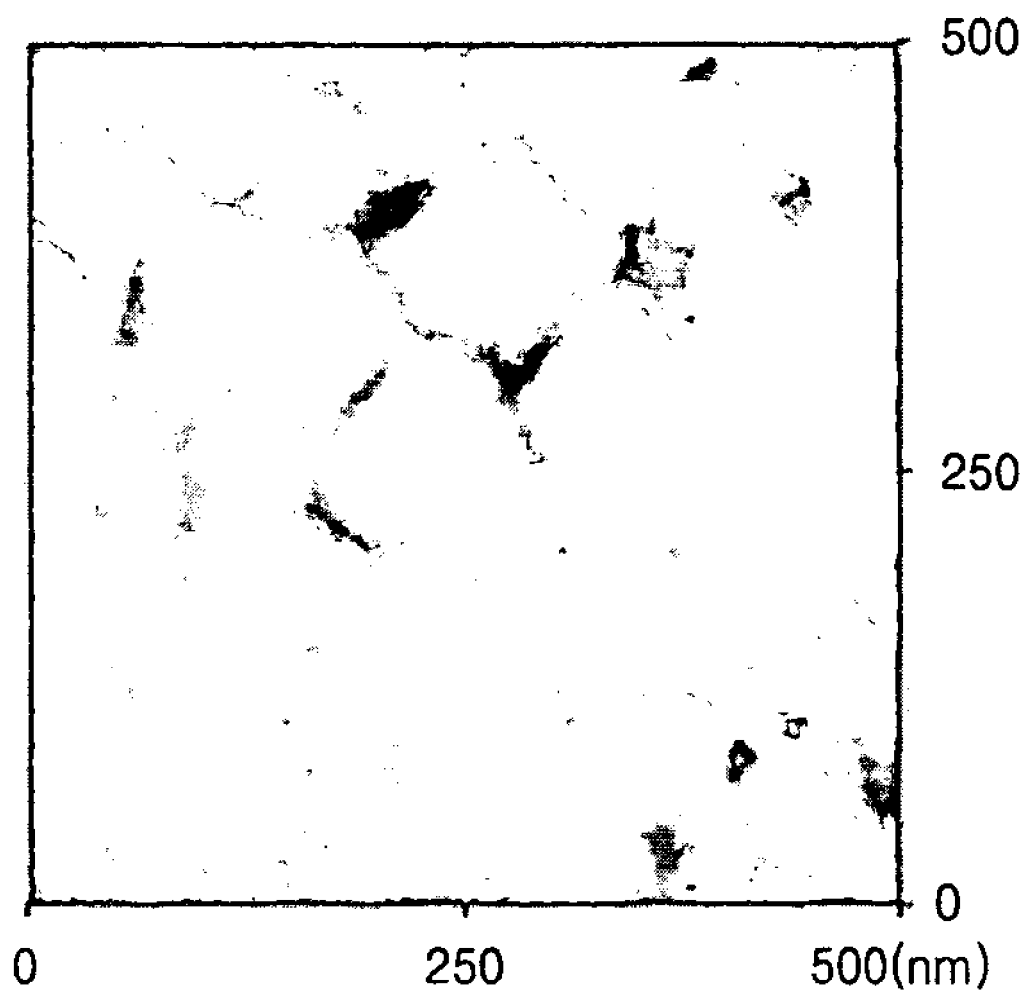

FIGS. 3B and 3C are EFM images of a PZT test pieces, which are obtained using a probe according to the embodiment of FIG. 2.

The diameter of the conductive carbon nanotube tip of the probe is approximately 20 nm. The image of FIG. 3B shows a 1×1 $\mu m^2$ area of the test piece while the image of FIG. 3C shows a 500×500 $nm^2$ area of the test piece. FIGS. 3B and 3C illustrate that the EFM using the probe of FIG. 2 can provide sufficient resolution to clearly show a domain boundary having a size of approximately 100 nm.

Figure 4A:
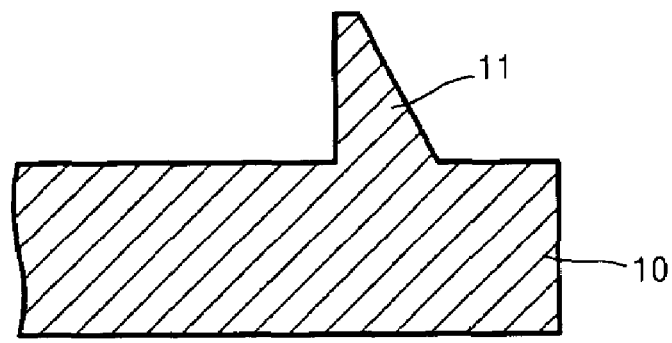
FIGS. 4A through 4C are views illustrating a method of manufacturing a conductive carbon nanotube tip according to an embodiment of the present invention.
Figure 4B:
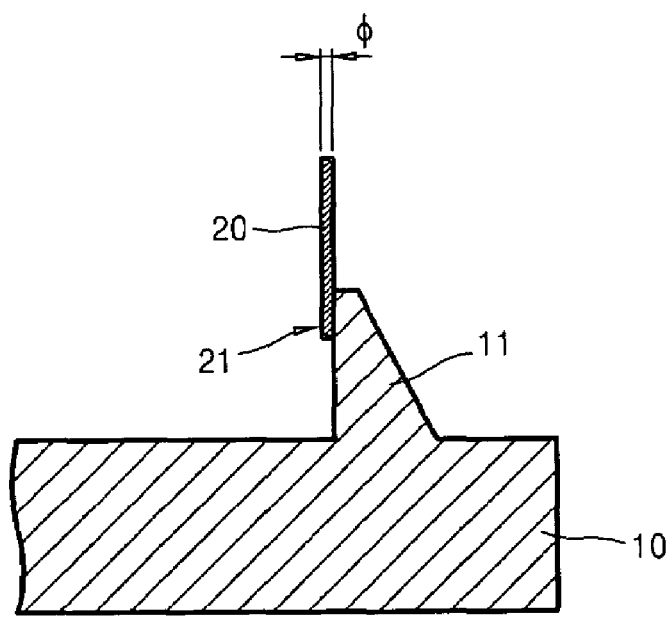
Figure 4C:
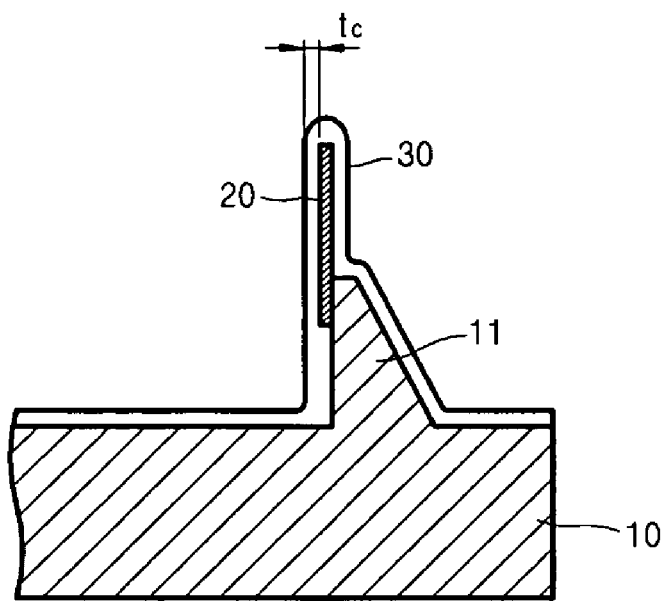

FIGS. 4A through 4C are views illustrating a method of forming a conductive carbon nanotube tip according to an embodiment of the present invention.

Referring first to FIGS. 4A and 4B, the carbon nanotube 20 is vertically arranged on the substrate 10 to form the carbon nanotube tip. Then, as shown in FIG. 4C, the ruthenium coating layer 30 is formed on the carbon nanotube tip and at least a part of the substrate 10.

The protrusion 11 may be formed on the substrate 10. The protrusion 11 may be formed through a chemical etching process, a physical grinding process, or a combination thereof. The protrusion 11 may be formed in a shape selected from the group consisting of a circular cone, a polygonal cone, a circular truncated cone, a polygonal truncated cone, and a polygonal pillar. For example, the prior art silicon tip manufacturing technology may be used.

After the protrusion 11 is formed, the carbon nanotube 20 is vertically arranged on the apex of the protrusion 11. The carbon nanotube 20 has a diameter of approximately 5 nm. In order to vertically arrange the carbon nanotube 20 on the substrate 10, a variety of methods can be used. For example, the substrate 10 on which the protrusion 11 is formed can be loaded in a reaction furnace and a plasma enhanced chemical vapor deposition (PECVD) performed to allow the carbon nanotube 20 to be adhered to the protrusion 11 and grown.

Alternatively, a catalytic point formed of transition metal can be formed on the apex of the protrusion 11 so that the carbon nanotube 20 is grown from the catalytic metal point.

Alternatively, the carbon nanotube 20 can be separately prepared and the bottom of the carbon nanotube 20 adhered to the apex of the protrusion 11 by, for example, welding.

Next, the ruthenium coating layer 30 can be formed on the carbon nanotube 20 and at least a portion of the substrate 10 through the ALD process. The ruthenium coating layer 30 may be formed to fully cover the top surface of the substrate 10 or to partly cover a portion of the top surface of the substrate 10, which surrounds the bottom of the carbon nanotube 20 using a mask pattern. A thickness $t_c$ of the ruthenium coating layer 30 may be within the range approximately of 5-100 nm, and more preferably approximately 10-30 nm.

Figure 5:
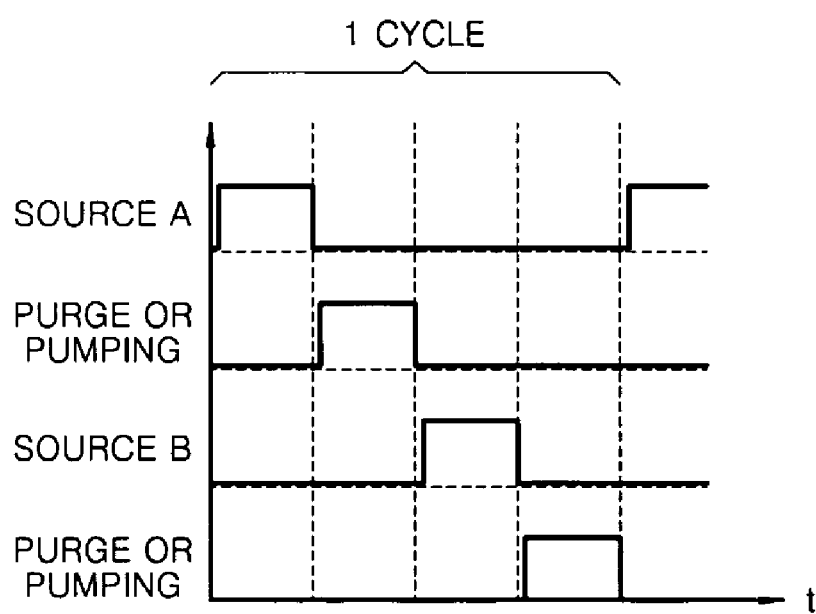
FIG. 5 is a time chart illustrating an atomic layer deposition process for forming a ruthenium coating layer.

FIG. 5 is a time chart illustrating the ALD process for forming a ruthenium coating layer.

Source gas A is injected into the reaction furnace so that the source gas A is absorbed in the surface of the substrate. Subsequently, a purge or pumping process is performed to allow only a chemical absorption component to remain on the surface of the substrate. Thereafter, source gas B is injected into the reaction furnace so that the source gas B reacts with the chemical absorption component remaining on the surface of the substrate. Then, the purge or pumping process is performed so that an AB unit layer (the ruthenium layer in this embodiment) can be formed by the reaction between the source gas B and the chemical absorption component. This is one cycle for forming the atomic unit layer. By repeating this cycle, the desired layer thickness can be obtained. The source gases A and B may be formed in a variety of combinations including well-known precursors of the ruthenium. The thickness of the ruthenium coating layer 30 may be adjusted according to the number of the cycles repeated.

According to the present invention, the conductive carbon nanotube tip is reduced in a diameter and increased in a ratio of the height to the diameter and a bending strength. Therefore, when the conductive carbon nanotube tip of the present invention is applied to a probe of a scanning probe microscope, the resolution and endurance of the probe can be improved.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A conductive carbon nanotube tip comprising:
    a carbon nanotube tip substantially vertically placed on a substrate; and
    a ruthenium coating layer covering a surface of the carbon nanotube tip and extending to at least a part of the substrate.

2. The conductive carbon nanotube tip of claim 1, wherein a thickness of the ruthenium coating layer is approximately 5-100 nm.

3. The conductive carbon nanotube tip of claim 1, wherein the thickness of the ruthenium coating layer is approximately 10-30 nm.

4. The conductive carbon nanotube tip of claim 1, wherein the ruthenium coating layer is formed through an atomic layer deposition (ALD) process.

5. A probe of a scanning probe microscope, comprising:
    a cantilever having a first end fixed on a support;
    a carbon nanotube tip substantially vertically placed on the cantilever near a second end thereof; and
    a ruthenium coating layer covering a surface of the carbon nanotube tip and extending to at least a part of the cantilever.

6. The probe of claim 5, wherein a thickness of the ruthenium coating layer is approximately 5-100 nm.

7. The probe of claim 6, wherein the thickness of the ruthenium coating layer is approximately 10-30 nm.

8. The probe of claim 5, wherein the ruthenium coating layer is formed through an atomic layer deposition (ALD) process.

9. The probe of claim 5, wherein the cantilever is provided with a protrusion near the second end thereof and the carbon nanotube tip has a bottom fixed on the protrusion.

10. A method of manufacturing a conductive carbon nanotube tip, comprising:
    substantially vertically placing a carbon nanotube tip on a substrate; and
    forming a ruthenium coating layer on the carbon nanotube tip and at least a part of the substrate.

11. The method of claim 10, wherein the substantially vertically placing the carbon nanotube tip comprises forming a protrusion by etching or grinding the substrate and setting up the carbon nanotube on an apex of the protrusion.

12. The method of claim 10, wherein a thickness of the ruthenium coating layer is approximately 5-100 nm.

13. The method of claim 12, wherein the thickness of the ruthenium coating layer is approximately 10-30 nm.

* * * * *